United States Patent
Joutsjoki et al.

(10) Patent No.: US 6,758,324 B2
(45) Date of Patent: Jul. 6, 2004

(54) RECIPROCATING CONVEYOR FOR TRANSPORTING HEAVY CYLINDRICAL OBJECTS

(75) Inventors: Jukka Joutsjoki, Järvenpää (FI); Risto Kitunen, Kouvola (FI); Raimo Ruohio, Hämeenkoski (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 10/257,495

(22) PCT Filed: Apr. 10, 2001

(86) PCT No.: PCT/FI01/00355

§ 371 (c)(1),
(2), (4) Date: Oct. 10, 2002

(87) PCT Pub. No.: WO01/76987

PCT Pub. Date: Oct. 18, 2001

(65) Prior Publication Data

US 2003/0094349 A1 May 22, 2003

(30) Foreign Application Priority Data

Apr. 12, 2000 (FI) ............................................. 20000876

(51) Int. Cl.$^7$ ......................... B65G 29/00; B65G 37/00; B65G 47/04; B65G 47/34; B65G 47/84
(52) U.S. Cl. ............................... 198/479.1; 198/468.6; 198/468.8; 414/392; 414/911
(58) Field of Search .................... 198/370.04, 479.1, 198/468.6, 468.8; 414/391, 392, 399, 910, 911

(56) References Cited

U.S. PATENT DOCUMENTS

| | | | | |
|---|---|---|---|---|
| 5,274,984 A | * | 1/1994 | Fukuda | ....................... 414/911 |
| 5,286,157 A | | 2/1994 | Vainio et al. | ................ 414/273 |
| 5,833,167 A | * | 11/1998 | Thuer et al. | ............... 414/749.3 |
| 6,311,823 B1 | | 11/2001 | Bierbaum et al. | ........... 198/360 |

FOREIGN PATENT DOCUMENTS

| | | | | |
|---|---|---|---|---|
| EP | 0 143 093 | | 5/1985 | ........... B65G/25/00 |
| FR | 2 743 044 | | 7/1997 | ........... B61B/13/00 |
| WO | WO 99/10266 | | 3/1999 | ........... B65H/19/12 |

* cited by examiner

Primary Examiner—Gene O. Crawford
(74) Attorney, Agent, or Firm—Cohen, Pontani, Lieberman & Pavane

(57) ABSTRACT

The present invention discloses a lift-table flatcar conveyor for transferring a roll (3) or, respectively, group of rolls of cardboard, cellulose or paper from a first station to a second station, the lift-table flatcar conveyor comprising a rail (2) arranged between the first station and the second station and, arranged back-and-forth movable along the rail (2) between the first station and the second station, a flatcar (1) onto which the roll (3) or, respectively, a group of rolls is movable. During the transfer operation, the roll (3) or, respectively, the group of rolls moved onto said flatcar (1) is supported by support means (4) that are adapted rotatable for the duration of the return travel of the flatcar (1) from the second station to the first station into a home position, wherein the support means (4) can pass rolls (3) waiting on the stations without making a physical contact with the rolls.

24 Claims, 4 Drawing Sheets

RECIPROCATING CONVEYOR FOR TRANSPORTING HEAVY CYLINDRICAL OBJECTS

PRIORITY CLAIM

This is a national stage of application No. PCT/FI01/00355, filed on Apr. 10, 2001. Priority is claimed on that application and on Application No. 20000876, filed in Finland on Apr. 12, 2000.

BACKGROUND OF THE INVENTION

The present invention relates to a lift-table flatcar conveyor.

The invention also relates to a method for transferring rolls or roll groups by means of a lift-table flatcar conveyor.

Rolls coming from a papermaking machine are slit at a slitter-winder into rolls of narrower width according to customer order, followed by packaging of the rolls at a packaging machine. During the packaging operation, the roll ends are first provided with inner headers and next a sufficient number of convolutions of a wrapper material is wound about the roll on the wrapper station of the packaging machine, whereupon the overlap portion of the wrapper is draped over the inner headers placed on the roll ends. In some instances, a number of wrapper material convolutions is first wound about the roll, followed by the insertion of the inner headers into the tubes formed by the wrapper overlap at the roll ends and the wrapper rims are next draped over the inner headers. Generally, an outer header is attached by hot-melt glueing onto the draped wrapper rim and the inner header at the end platen press of the packaging machine.

The widths of the narrowest customer rolls coming from the slitter to the packaging machine vary in the range of 100–500 mm. For instance, in mills making fine paper grades, the roll widths of narrow rolls are typically from 180 mm to 400 mm, in cardboard mills from 350 mm to 500 mm and in the manufacture of roll cores from 100 mm to 300 mm. Narrow rolls are packed either individually wrapped or, typically, as two- or multi-roll packs containing 2–4 rolls bunched end-to-end. The customer rolls to be packaged in two- and multi-roll packs are normally wrapped together immediately after they leave the slitter, because their handling and carrying in bundled form is much easier.

The rolls to be packaged can be transferred from one station of the packaging machine to another using a lift-table conveyor in which a single roll or a group of rolls is placed on a flatcar that moves backward and forward along a long track between two successive stations of the packaging machine. Herein, a roll resting on the support rolls of the first station is moved uphill along the track and by way of lifting up the platform table of the flatcar, whereupon the roll can be moved to the second station on the flatcar. Subsequently, the roll is delivered onto the support rolls of the second station by lowering both the track and the platform table. Finally, the flatcar is returned to the first station to fetch the next roll. The roll being transferred is placed on the flatcar so that the center axis of the roll is aligned parallel to the travel direction of the flatcar, which means that the roll can readily topple when the flatcar accelerates or decelerates its speed. The risk of roll toppling is particularly imminent when narrow rolls are being transferred by fast conveyors. It may also happen that narrow rolls at the ends of a roll group fall sideways during the transfer operation. Obviously, the problem can be eliminated by reducing the acceleration or deceleration rate of the flatcar units. This, however, also reduces the throughput capacity of the roll packaging machine.

SUMMARY OF THE INVENTION

It is an object of the present invention to provide an entirely new type of lift-table flatcar conveyor and a method for transferring rolls or roll groups on a lift-table flatcar conveyor so that the above-mentioned complications are overcome.

The goal of the invention is achieved by way of providing the lift-table flatcar conveyor with support means such as support arms that support the roll or roll group being transferred and keep the same upright during the transfer operation. The support arms are arranged to press against both ends of the roll or roll group during transfer. During the return travel of the conveyor flatcar, the support means are rotated into a home position, wherein they can move without the risk of a physical contact past rolls or roll groups resting on the stations of the packaging machine. Advantageously, the home position of the support arms is such that the arms are rotated downward in a position parallel to the tracks, whereby the arms can travel below the rolls resting on the stations at a level which is lower than that on which the rolls are resting. Further advantageously, the support means are integrated with the construction of the lift-table flatcar traveling between the stations of the packaging machine.

More specifically, the lift-table flatcar conveyor according to the invention is characterized by what is stated in the characterizing part of claim 1.

Furthermore, the method according to the invention for transferring rolls or roll groups on a lift-table flatcar conveyor is characterized by what is stated in the characterizing part of claim 8.

The invention offers significant benefits.

By virtue of the invention, the capacity of a roll packaging machine increases substantially because rolls can be transferred without the risk of toppling at an increased speed between the stations of the packaging machine. A lift-table flatcar conveyor according to the invention is capable of safely transferring in an upright position rolls about 150 mm wide, while transfer systems lacking support means can transfer at a comparable speed only rolls having a width of about 400 mm or wider. During the return travel of the conveyor flatcar, the support arms are arranged to move past the rolls or roll groups resting on the stations of the packaging machine. Advantageously, the home position of the support arms is such that the arms are rotated downward in a position parallel to the tracks, whereby the arms can travel below the rolls resting on the stations at a level which is lower than that on which the rolls are resting and, thus, do not need any clearance to be provided on the sides of the conveyor track. Moreover, the support means according to the invention have a simple construction and can be retrofitted on existing lift-table flatcar conveyor, too.

BRIEF DESCRIPTION OF THE DRAWINGS

In the following, the invention will be examined in greater detail with the help of exemplifying embodiments and making reference to the appended drawings in which.

DETAILED DESCRIPTION OF THE PRESENTLY PREFERRED EMBODIMENTS

The number of flatcars in a lift-table flatcar conveyor system is typically 3 to 5, advantageously one less than the number of stations in the packaging machine, whereby each track connecting two stations is used by one flatcar. Generally, the flatcars are connected to each other and move backward and forward between the stations, which means that the distances between neighboring stations must be equal. The last station of the packaging machine normally has no rolls when the transfer sequence of the flatcars 1 is started. The rolls are moved on the flatcars 1 with the rails 2 and the lift-table flatcars 1 driven into their upper position, while the return of the flatcars 1 takes place with the rails 2 and the flatcars 1 driven into their lower position. Prior to the arrival of a new roll, the roll resting on the last station of the packaging machine is moved from the station onto a ramp by means of a pusher, for instance.

Figure 1:
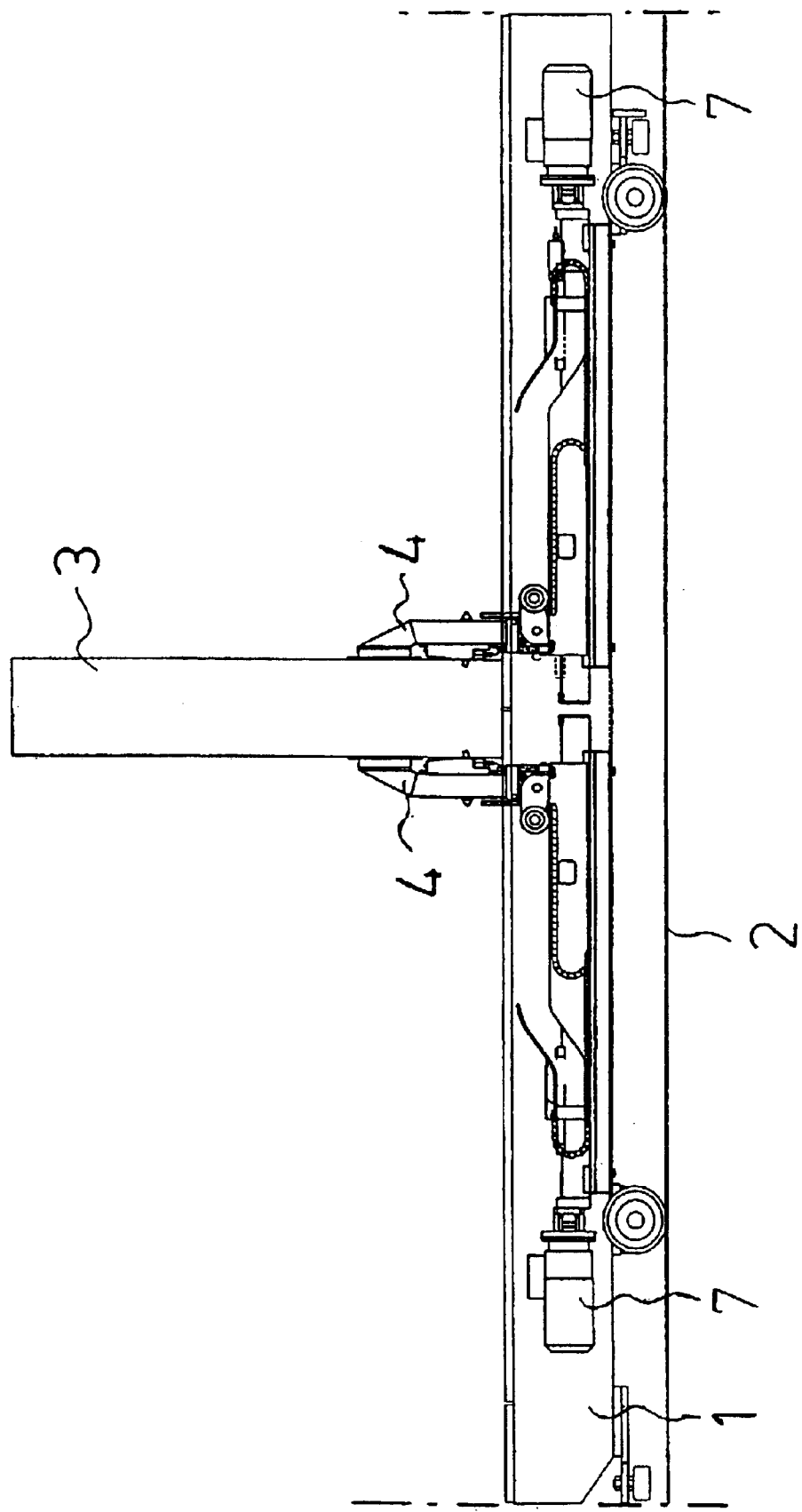
FIG. 1 shows a side view of an embodiment of the lift-table flatcar conveyor according to the invention with the support means set in their supporting position.
Figure 4:
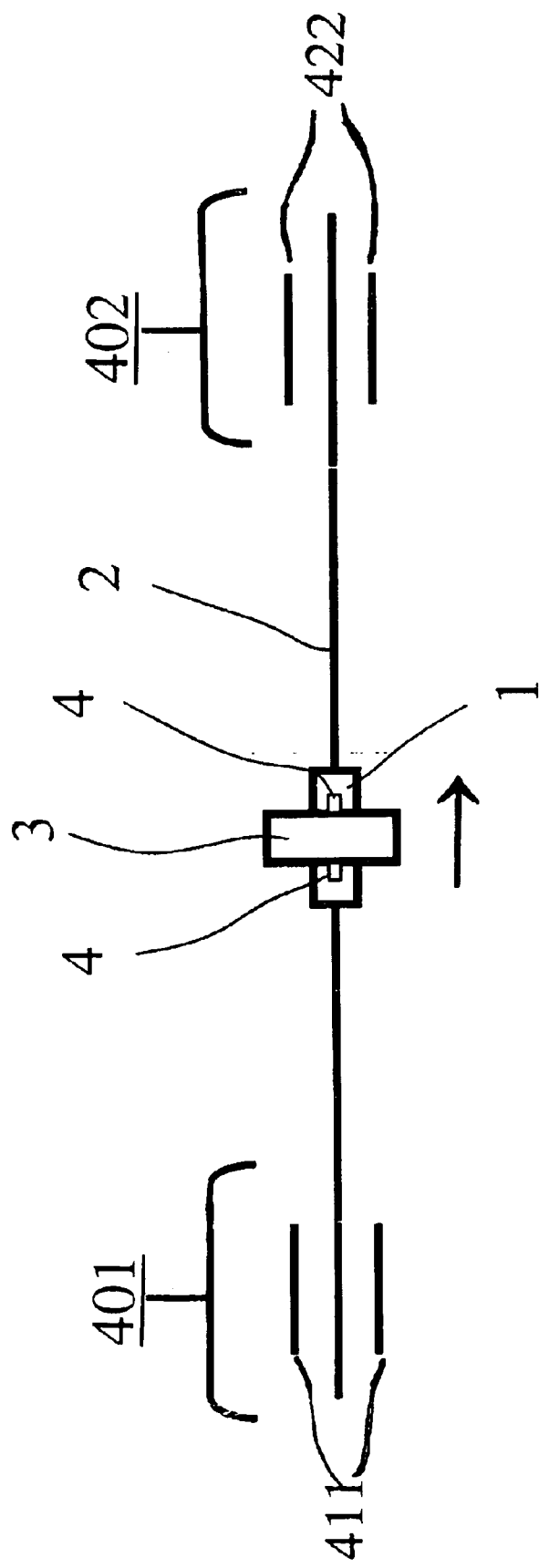
FIG. 4 shows a top view of the flatcar of FIGS. 1–3 on the rails 2 between the first station and the second station.

As shown in FIGS. 1 and 4, the flatcar 1 of the lift-table flatcar conveyor is arranged to move along a linear track such as rails 2 between a first station 401 and a second station 402 of a roll packaging machine. Roll 3 resting on support rolls on the first station 401 of the packaging machine is elevated upward by lifting the rails 2 and the flatcar 1 by means of lift cylinders and levers (not shown), whereupon support arms 4 mounted on the flatcar 1 are rotated into supporting positions against both ends of the roll 3. Subsequently, the flatcar 1 with the roll 3 resting thereon supported by the support arms 4 is transferred along the rails 2 to the second station 402 of the packaging machine. As shown in FIG. 4, the roll 3 being transferred is placed on the flatcar 1 so that the center axis of the roll is parallel to the travel direction (as indicated by the arrow in FIG. 4) of the flatcar 1.

Figure 2:
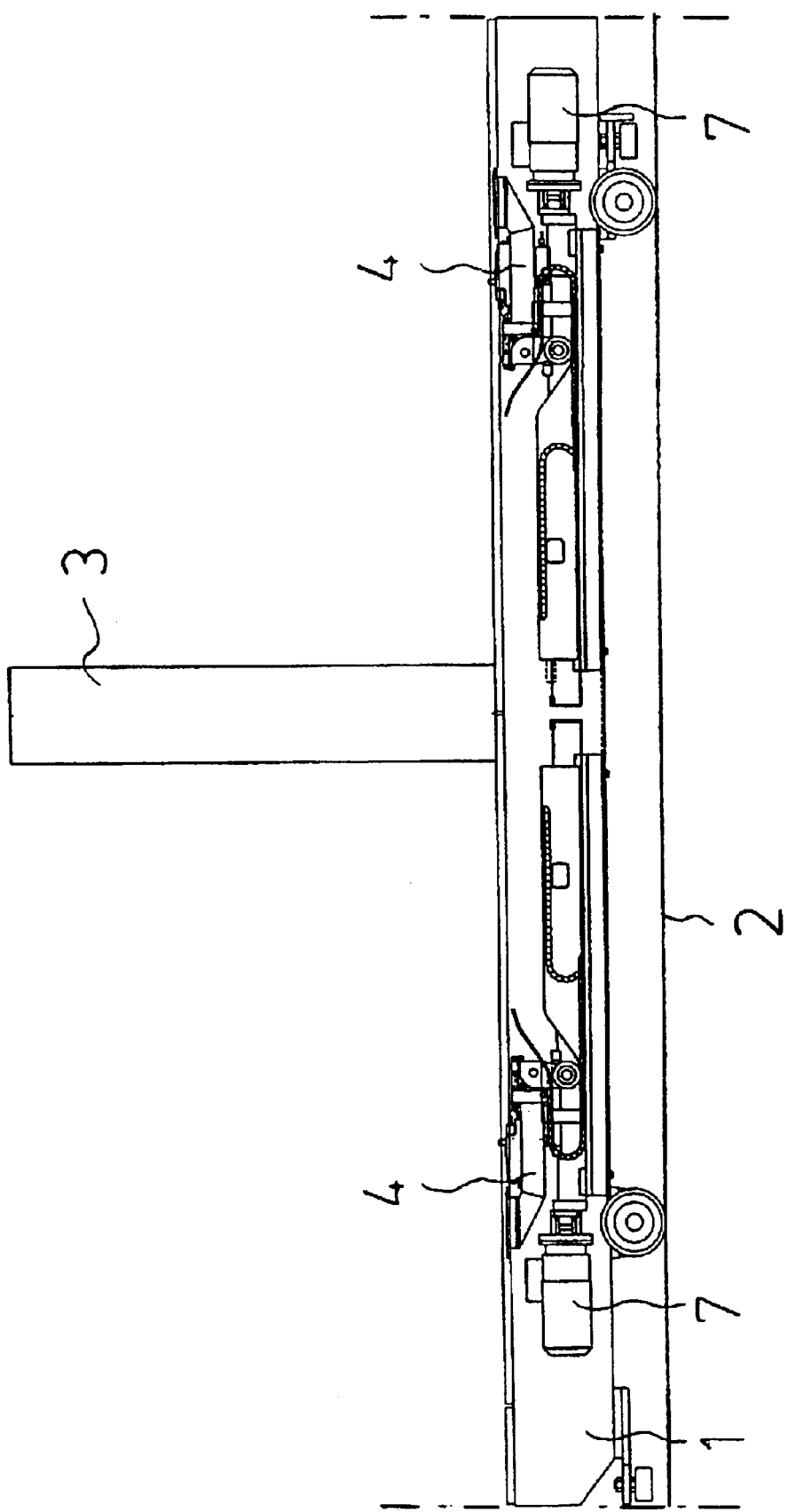
FIG. 2 shows the lift-table flatcar conveyor of FIG. 1 with the support means set in their home position for the return travel of the flatcar.

On the second station 402 of the packaging machine, the support arms 4 are released and rotated downward into their home position parallel to the rails 2 as shown in FIG. 2 for the return movement of the flatcar. Next, the flatcar 1 and the rails 2 are lowered, whereby the roll 3 remains resting on the support rolls 422 of the second station 402. Subsequently, the flatcar 1 is returned along the rails 2 back to the first station. During the return movement of the flatcar, the support arms 4 in their home position can pass from under the roll 3 transferred onto the support roll 422 of the second station 402 and the new roll now waiting on the support rolls 411 of the first station 401 without making a physical contact with either of the rolls, since the arms travel below the horizontal level defined by the rolls. Next, the new roll resting on the support rolls 411 is elevated through lifting the rails 2 and the flatcar 1 running thereon by means of lift cylinders and levers, whereupon support arms 4 are rotated into supporting positions against both ends of the new roll. If the new roll resting on the first station 401 cannot be transferred immediately to the second station 402, the transfer cycle time may anyhow be optimized by moving the support arms 4 close to the ends of the new roll, whereby only a short final movement is needed to drive the support arms 4 into their supporting position. The new roll thus secured is moved onto the support rolls of the second station 402 similarly as the preceding roll 3.

Figure 3:
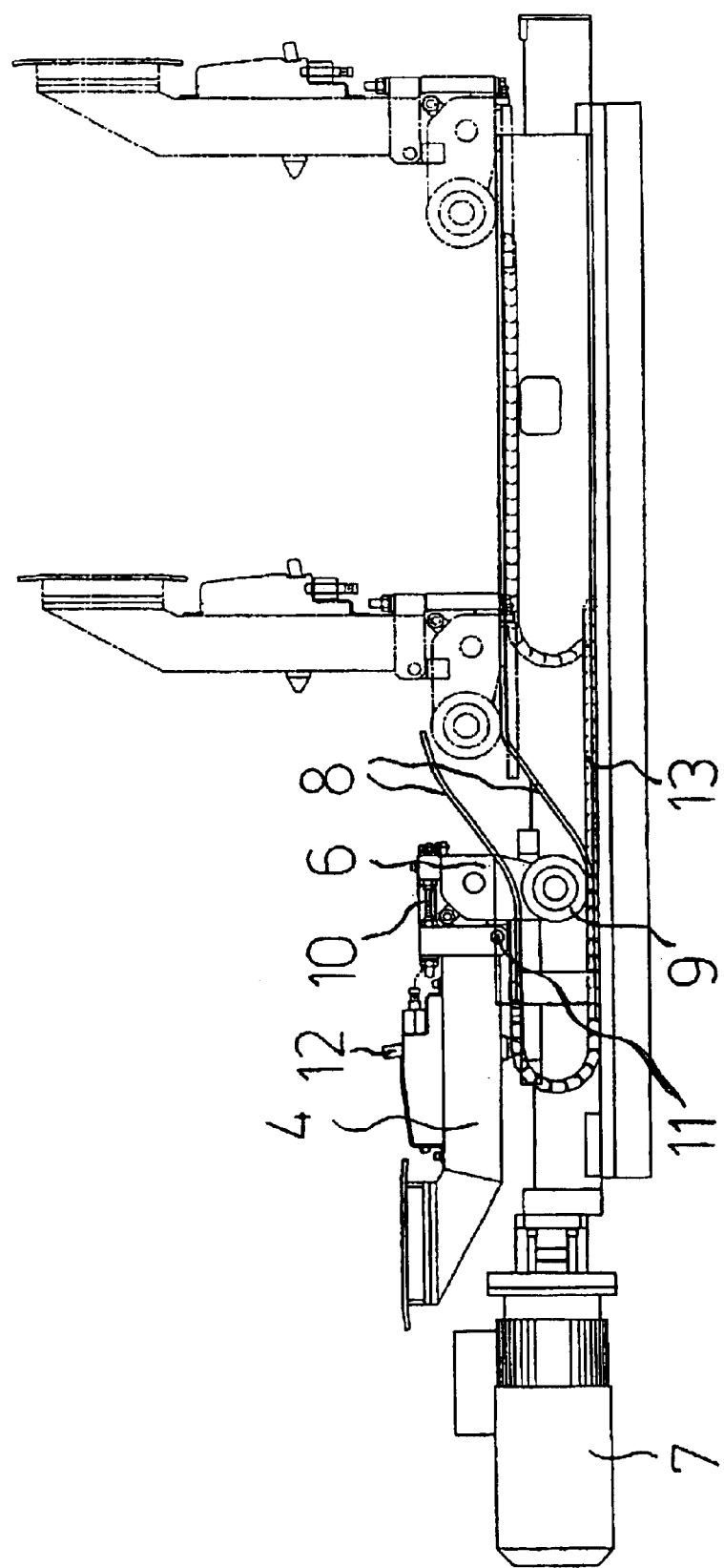
FIG. 3 shows the lift-table flatcar conveyor of FIGS. 1 and 2 with the support means set in their different positions.

The construction and movements of an embodiment of the lift-table flatcar conveyor according to the invention between its supporting and return positions is shown in more detail in FIG. 3. The support arm 4 adapted to press against the roll end is pivoted rigidly on a base 6 that moves driven by a circulating-ball screw connected to a motor 7. To both sides of the flatcar 1 are mounted guiding surfaces such as guide tracks 8 along which wheels 9 mounted on the base are arranged to run. The support arm 4 is mounted on bearings on a shaft connecting the wheels 9. If the load imposed on the support arm 4 becomes too high, a safety pin 10 connecting the support arm 4 to the base 6 breaks, whereby the support arm 4 can swing about its pivot point 11. Mounted on the support arm 4 is a sensor 12 that senses the support arm 4 having reached the end of the roll or, respectively, group of rolls to be transferred. The support arm 4 is further provided with a limit sensor senses the support arm 4 having reached its retracted home position for the return movement of the flatcar. The electrical cables of the flatcar 1 are placed in an articulated chain 13 protecting the cables during the horizontal movement of the flatcar.

When the base 6 is moved by the motor 7 and the circulating-ball screw connected thereto, the wheels 9 run along the guide tracks 8. The support arm 4 moves from its horizontal home position into its vertical supporting position when the wheels 9 move upward along the slanted portions of the tracks 8. Next, the wheels 9 run along the horizontal portions of the tracks 8 toward the roll or, respectively, roll group to be transferred. The movement is stopped when sensor 12 detects the support arm 4 to rest against the roll or, respectively, roll group to be transferred. The return movement from the supporting position into the home position takes place in the reverse order.

In addition to those described above, the invention may have alternative embodiments.

For instance, the support arm 4 may be arranged to support only one end of the roll 3. The transfer of the roll 3 or, respectively, roll group from the support rolls to the flatcar 1 and, respectively, from the flatcar 1 onto the support rolls may also be implemented by a lifting/-lowering movement of the support rolls. If a sufficient footprint is available on the sides of the conveyor, the rotation of the support means 4 into their home position for the return travel of the flatcar may also be arranged to take place to the sides of the flatcar.

What is claimed is:

1. A lift-table flatcar conveyor for transferring a roll or group of rolls of cardboard, cellulose or paper from a first station to a second station, the lift-table flatcar conveyor comprising:

a rail arranged between the first station and the second station;

a flatcar being mounted on the rail so as to be movable back-and-forth therealong between the first station and the second station, the flatcar capable of being positioned proximate the first and second stations so that the roll or group of rolls is movable to be positioned on the flatcar so that a center axis of the roll or group of rolls is parallel to a travel direction of the flatcar along the rail; and a support means mounted to the flatcar for supporting the roll or group of rolls moved onto the flatcar during transfer between the first station and the second station by pressing against at least one of the ends of the roll or group of rolls during the transfer, the support means being rotatable into a home position during return travel of the flatcar from the second station to the first station, the home position being such that said support means can pass a roll or group of rolls waiting on said stations without contacting said waiting roll or group of rolls.

2. The lift-table flatcar conveyor of claim 1, further comprising:

a guide track mounted onto the flatcar, and wherein said support means is capable of moving along the guide track.

3. The lift-table flatcar conveyor of claim 1, further comprising:
support rolls at the first and second stations on which the roll or group of rolls being transferred can be placed.

4. The lift-table flatcar conveyor of claim 1, wherein said support means comprises:
support arms adapted to press against both ends of said roll or group of rolls to be transferred.

5. The lift-table flatcar conveyor of claim 4, further comprising:
a guide track mounted onto the flatcar, and wherein said support means is capable of moving along the guide track.

6. The lift-table flatcar conveyor of claim 1, wherein, in the home position, the support means is rotated into a downward position parallel to the track to allow the support means to travel past and below said roll or group of rolls waiting on the first station.

7. The lift-table flatcar conveyor of claim 6, wherein said support means comprises:
support arms adapted to press against both ends of said roll or group of rolls to be transferred.

8. The lift-table flatcar conveyor of claim 7, further comprising:
a guide track mounted onto the flatcar, and wherein said support means is capable of moving along the guide track.

9. A method for transferring a roll or group of rolls of cardboard, cellulose or paper from a first station to a second station by means of a lift-table flatcar conveyor comprising a rail arranged between said first station and said second station and, a flatcar being mounted on the rail so as to be movable back-and-forth therealong between the first station and the second station, the method comprising the steps of:
moving said roll or group of rolls on said first station onto said flatcar so that a center axis of said roll or group of rolls is parallel to a travel direction of said flatcar along the rail;
moving said flatcar bearing said roll or group of rolls from said first station to said second station;
supporting said roll or group of rolls by support means during the moving of said flatcar from said first station to said second station, said support means pressing against at least one of the ends of said roll or group of rolls during the moving of said flatcar from said first station to said second station;
removing said roll or group of rolls from said flatcar to said second station;
returning said flatcar from said second station to said first station after said roll or group of rolls has been removed from said flatcar; and
rotating said support means into a home position during return travel of said flatcar from said second station to said first station, the home position being such that said support means can pass a roll or group of rolls waiting on said stations without contacting said waiting roll or group of rolls.

10. The method of claim 9, wherein said support means comprises support arms adapted to press against both ends of said roll or group of rolls to be transferred.

11. The method of claim 9, wherein said first station and said second station include support rolls on which said roll or group of rolls to be transferred are placed.

12. The method of claim 9, wherein the home position of said support means is such that said support means is rotated into a downward position to allow said support means to travel below said waiting roll or group of rolls.

13. The method of claim 12, wherein said support means comprises support arms adapted to press against both ends of said roll or group of rolls to be transferred.

14. A flatcar in a lift-table flatcar conveyor for transferring a roll or group of rolls of cardboard, cellulose or paper from a first station to a second station on a rail arranged between said first and second stations, the flatcar comprising:
a support means mounted to the flatcar for supporting a roll or group of rolls that are positioned so that a center axis of said roll or group of rolls is parallel to a travel direction of the flatcar along said rail between said first and second stations, wherein said support means supports said roll or group of rolls by pressing against at least one of the ends of the roll or group of rolls to thereby substantially prevent toppling of said roll or group of rolls while the flatcar is in motion;
wherein the support means is rotatable into a home position in which it is possible for the flatcar to move into at least one of said first or second stations without substantially touching any roll or group of rolls waiting at said at least one of said first and second stations.

15. The flatcar of claim 14, further comprising:
a guide track by which said support means is capable of moving from a supporting position to said home position.

16. The flatcar of claim 14, wherein said first and second stations are stations within a packaging machine for the packaging of rolls coming from a papermaking machine.

17. The flatcar of claim 14, wherein said support means comprises:
support arms adapted to press against both ends of said roll or group of rolls.

18. The flatcar of claim 14, wherein at least one of said roll or group of rolls has a relatively narrow width in the sense that acceleration or deceleration of the flatcar could possibly cause toppling of said roll or at least one end roll of said group of rolls.

19. The flatcar of claim 18, wherein at least one of said roll or group of rolls has a width of less than about a meter.

20. The flatcar of claim 19, wherein at least one of said roll or group of rolls has a width of less than about 500 mm.

21. The flatcar of claim 20, wherein said roll or group of rolls is of paper, and at least one of said roll or group of rolls has a width of less than about 400 mm.

22. The flatcar of claim 20, wherein said roll or group of rolls is of cardboard, and at least one of said roll or group of rolls has a width of less than about 500 mm.

23. The flatcar of claim 20, wherein at least one of said roll or group of rolls is a roll core, and said roll core has a width of less than about 300 mm.

24. The flatcar of claim 19, wherein at least one of said roll or group of rolls has a width of about 150 mm.

* * * * *